United States Patent
Roth et al.

(10) Patent No.: US 6,842,812 B1
(45) Date of Patent: Jan. 11, 2005

(54) EVENT HANDLING

(75) Inventors: Charles P. Roth, Austin, TX (US);
Ravi P. Singh, Austin, TX (US);
Gregory A. Overkamp, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 09/705,207

(22) Filed: Nov. 2, 2000

(51) Int. Cl.⁷ .............................................. G06F 13/24
(52) U.S. Cl. ..................................... 710/262; 710/264
(58) Field of Search ................................ 710/260–264, 710/266, 268

(56) References Cited

U.S. PATENT DOCUMENTS

| | | | |
|---|---|---|---|
| 5,163,152 A | 11/1992 | Okamoto | |
| 5,555,420 A * | 9/1996 | Sarangdhar et al. | 710/266 |
| 5,765,003 A | 6/1998 | MacDonald et al. | |
| 5,958,036 A | 9/1999 | Burns et al. | |
| 6,029,223 A | 2/2000 | Klein | |
| 6,070,221 A | 5/2000 | Nakamura | |
| 6,651,126 B1 * | 11/2003 | Cantrell et al. | 710/264 |

* cited by examiner

*Primary Examiner*—Khanh Dang
*Assistant Examiner*—Clifford Knoll
(74) *Attorney, Agent, or Firm*—Fish & Richardson P.C.

(57) ABSTRACT

In one embodiment, a processor is arranged to handle events. The events handled by the processor have an assigned priority. When a first event is serviced, a first priority mask is generated based on the assigned priority of the first event. The priority mask indicates a set of serviceable events and a set of non-serviceable events and may be written to a priority register. When a second event is received, the priority mask is used to determine whether the second event should preempt the first event and be immediately serviced.

27 Claims, 14 Drawing Sheets

EVENT HANDLING

BACKGROUND

This invention relates to event handing in a programmable processor.

One challenge in designing a programmable microprocessor, such as a digital signal processor, is the handling of events including interrupts and exceptions. An interrupt may be an event that changes the normal instruction flow in the processor. An exception may be a software-initiated event that arises when an error is encountered, such as invalid instruction or bus error. In designing a processor, it is desirable to handle events as quickly as possible. However, this typically involves additional hardware that may increase the power consumption of the processor.

Challenges in event handling may be compounded by the fact that interrupts may be nested. In other words, a second interrupt (e.g. a nested interrupt) may be received while a first interrupt is still being handled. Thus, at any given time, a number of interrupt service routines can be active. Event handling may require a prioritization scheme to deal with multiple active service routines in the most efficient manner.

DESCRIPTION

Figure 1:
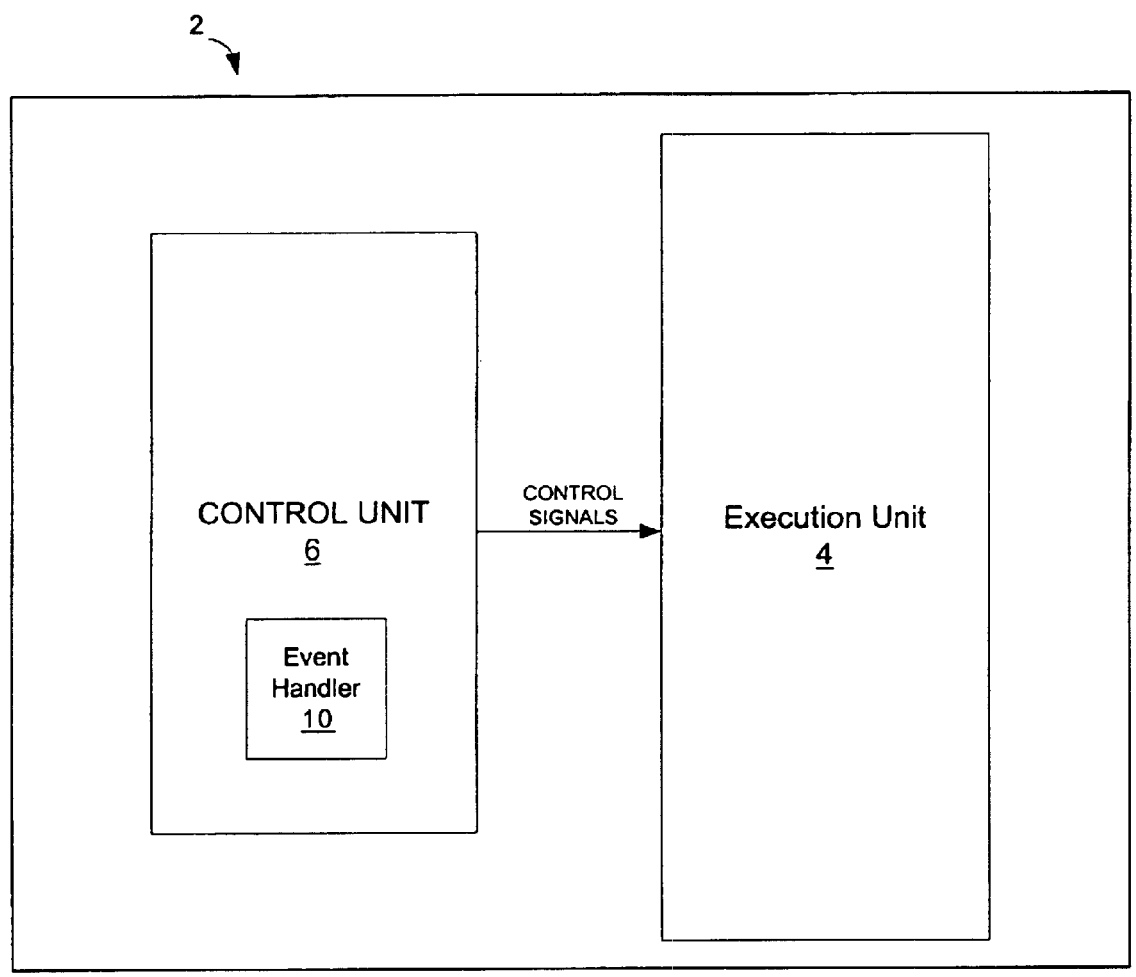
FIG. 1 is a block diagram illustrating a programmable processor in accordance with an embodiment of the present invention.

FIG. 1 is a block diagram illustrating a programmable processor 2 having an execution unit 4 and a control unit 6. Control unit 6 may have an event handler 10. Event handler 10, as described in detail below, may decrease the computational time of handling events. In particular, event handler 10 may generate a priority mask that indicates a set of serviceable events and a set of non-serviceable events. In this manner, processor 2 may quickly recognize and process serviceable events.

Execution unit 4 may be an execution pipeline that has a number of stages for processing instructions. Each stage may process concurrently with the other stages and pass results to the next stage in pipeline at each clock cycle. The final results of each instruction may emerge at the end of the pipeline in rapid succession.

Control unit 6 may control the flow of instructions and data through the execution unit 4. During the processing of an instruction, for example, control unit 6 may direct the various components of the execution unit to fetch and decode the instruction, perform the corresponding operation, and write the results back to memory or local registers.

Figure 2:
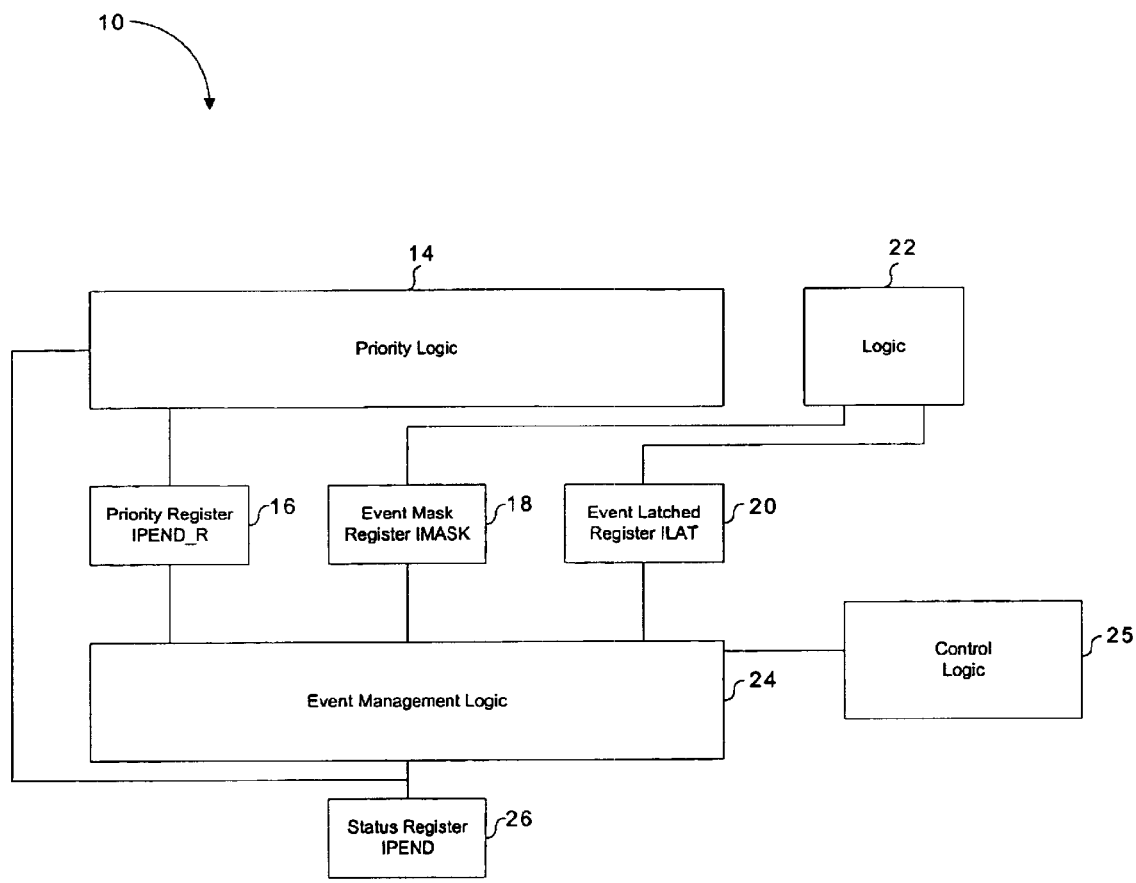
FIG. 2 is a block diagram illustrating an embodiment of an event handler.

FIG. 2 is a block diagram illustrating an embodiment of an event handler 10. The event handler 10 may have priority logic 14 connected to an event priority register (IPEND_R) 16. The event handler 10 may also have an event mask register (IMASK) 18 and an event latched register (ILAT) 20. Logic 22 may be connected to IMASK 18 and ILAT 20. The IPEND_R 16, IMASK 18 and ILAT 20 may all be connected to event management logic 24. Event management logic 24 may be connected to control logic 25. In addition, event management logic 24 may be connected to a status register (IPEND) 26. Moreover, event management logic 24 may be connected back to the priority logic 14.

The events handled by processor 2 may have an event priority. Registers 16, 18, 20 and 26 may have the same width, and each register may have a plurality of numbered bits. Moreover, similarly numbered bits in the respective registers 16, 18, 20 and 26 may be associated with the same event. Thus, the events handled by processor 2 may have an associated bit in registers 16, 18, 20 and 26.

In an exemplary embodiment, registers 16, 18, 20 and 26 are sixteen bit registers. Each register may have a bit that corresponds to one of sixteen events (e.g. events 0–15). Events 0–15 may be prioritized such that the $0^{th}$ event is the highest priority event and the $15^{th}$ event is the lowest priority event. By way of example, events 0–15 may be prioritized as follows: emulation 0, reset 1, non-maskable interrupt 2, exception 3, global interrupt enable 4, hardware error 5, high priority timer 6 and general interrupts 7–15 in order of general interrupt priority.

The IMASK register 18 may be an event mask register that facilitates enabling or disabling an event. Thus, each bit in IMASK 18 may indicate whether the corresponding event is enabled. If, for instance, the IMASK bit for a particular event is one, then the event is enabled. If an event is not enabled, then the circuit may not service the event. The bits in the IMASK register 18 may be set via any method known in the art. These might include writing to a memory map register to set IMASK or executing a software instruction to set IMASK. In this manner, any event may be easily enabled or disabled.

In one particular embodiment, the IMASK register may have a smaller width than 16 bits even though 16 different priority instructions exist in the system. For instance, in this embodiment, certain high priority bits (e.g. 0–4) may never be masked. Thus, the IMASK register may not have bits to account for the events 0–4 that are always enabled.

The bits in the event latched register (ILAT) 20 may indicate when the corresponding event has been latched (or received) by the system. Any time an event is latched, its corresponding bit may be set to 1 in ILAT. Then, when the event is accepted by the system, the corresponding bit in ILAT may be reset to 0. Thus, ILAT may indicate the events that have been received but not yet serviced.

The bits in ILAT may be set by hardware request or a software request. Once set, the bit may be held in ILAT as long as the associated event is not accepted for service. However, once the event is accepted by the system, the bit in ILAT may be re-set back to zero. Additionally, in some embodiments, one or more bits in the ILAT may be cleared.

The IPEND register 26 may be a status register that keeps track of all currently active events. When an event is accepted by the system (and e.g. its bit in ILAT is reset to zero), its bit in IPEND may be set to one. At any given time, multiple events may be active, and therefore, multiple bits in IPEND may be set. However, only one event may be serviced at a time. Therefore, the highest priority bit that is set in IPEND may indicate which event is currently being serviced.

The IPEND_R 16 may be a priority register that reflects the priority of the event currently being serviced by the system. At the same time, the IPEND_R may provide an ongoing tab of serviceable events and non-serviceable events.

In one arrangement, the highest priority bit set in IPEND corresponds to an event active bit in IPEND_R. The event active bit in IPEND_R may be set to zero along with all lower priority bits in IPEND_R. All bits of a higher priority than the event active bit may be set to one. Thus, the event active bit in IPEND_R may be the highest priority bit that is set to zero in that register.

The IPEND_R may provide a fast and efficient way for processor 2 to detect serviceable events. Since the bits of a higher priority than the event active bit are set to one in the IPEND_R, event handler 10 may quickly identify an event as serviceable. If an event's bit in IPEND_R is a one, then it may be immediately serviceable.

Moreover, input of IPEND may provide the input to logic that calculates the value of IPEND_R. Therefore, any time the IPEND is adjusted (e.g. when a new event is taken), the IPEND_R may be automatically adjusted in the same clock cycle. In this manner, the IPEND_R may be available to enable event handler 10 to make priority decisions whenever a new event is received.

Using registers IPEND_R 16, ILAT 18 and IMASK 20, event handler may quickly and efficiently service an event. ILAT 18 may tell the event handler 10 the events that have been received, but not serviced. IMASK 20 may tell the handler 10 whether the processor 2 is enabled to service a particular event. And IPEND_R 16 may tell the handler whether an event is of a high enough priority to be immediately serviced. Thus, when an event's bit is one in all three of these registers, the event may be taken. Moreover, quick detection of the fact that a new event will be taken may allow event management logic 24 and control logic 25 to quickly and efficiently handle the change of flow to the new event's service routine.

Sometimes an event may not be immediately taken because a higher priority event is being serviced. For instance, if a higher priority event is currently being serviced, then IPEND_R may be zero for an event of lower priority. Therefore, the event may not be accepted by the system, and its ILAT bit may hold its value.

Eventually, however, the system may finish servicing the higher priority event. Once its service routine has finished, the higher priority event's bit may be set back to zero in IPEND and the IPEND_R may be adjusted. At this point, the lower priority event may be accepted into the system if its IPEND_R bit was adjusted to one.

Figure 3:
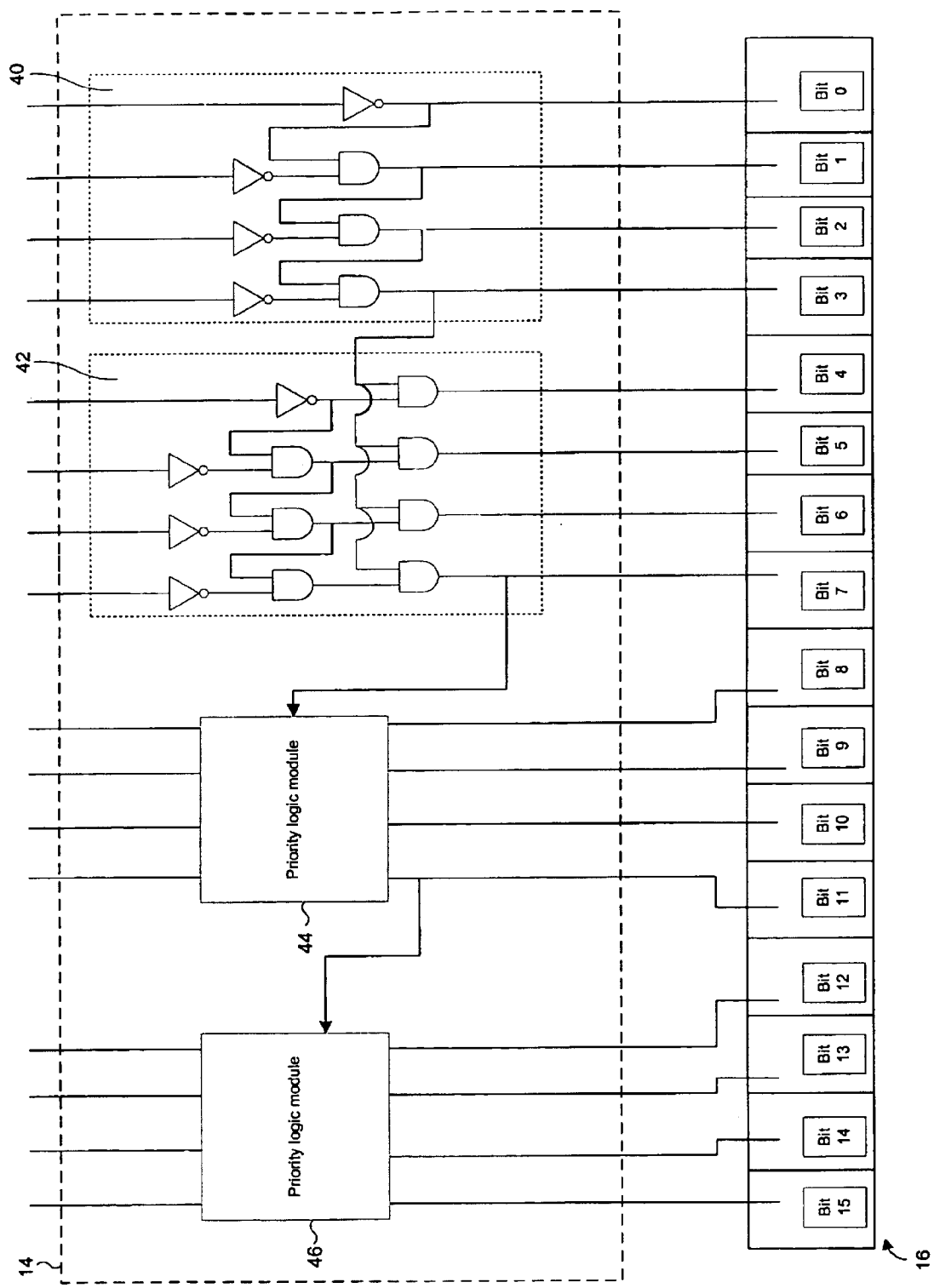
FIG. 3 is a circuit diagram illustrating an exemplary embodiment of priority logic.

FIG. 3 is a circuit diagram illustrating an exemplary embodiment of priority logic 14 used to generate a priority mask based on the assigned priority of an event. This priority mask may be written to IPEND_R and used by event handler 10 so that processor 2 can quickly recognize and process serviceable events.

Priority logic 14 may have sixteen inputs corresponding to one of the sixteen events. These sixteen inputs may come from the respective outputs of event management logic 24 that set the IPEND register (not shown). Priority logic may also have 16 outputs connected to the respective sixteen bits of the IPEND_R register 16.

Each respective input of priority logic 14 may come from the corresponding output of event management logic (not shown). When an event's bit is set to zero in IPEND by event management logic (not shown), priority logic may invert the zero and output a one for the events bit. When an event's bit is set to one in the IPEND by event management logic (not shown), priority logic 14 may invert the one and output a zero for the event's bit. In addition, when an event's bit is set to one in IPEND by event management logic (not shown), priority logic may be adapted to invert the one and propagate zeros for every bit of lower priority than the event's bit. This collection of ones and zeros generated by priority logic 14 may be a priority mask that gets written in the IPEND_R 16.

As shown in FIG. 3, one embodiment of priority logic 14 implements priority logic modules 40, 42, 44 and 46. These priority logic modules 40, 42, 44 and 46 may collectively generate the priority mask. For instance, if a one is inputted into priority logic module 40, 42, 44 or 46, that module may generate a subset of the priority mask for its respective bits. The subset of the priority mask may be generated by generating an event active bit (e.g., a zero) for an event that is received by a module, generating ones for higher priority events handled by the module and generating zeros for lower priority events handled by the module. A priority status bit may also be propagated to lower priority logic modules (e.g. resulting in the output of zeros for the events handled by lower priority modules). In addition, higher priority logic modules may output ones for the events they handle. In this manner, the collection of priority logic modules may generate the priority mask.

In a particular embodiment, the priority logic modules 40, 42, 44 and 46 are quads each having four inputs and four outputs. Any time a one is inputted to quad, outputs of all lower priority quads may be zeros. Moreover, if a one is received by a quad, the output of the corresponding bit and all lower priority bits within that quad may be zero, while the output of all higher priority bits may be one. As shown in FIG. 3, priority logic module 40 may be a quad having a single level of AND gates, while priority logic module 42 may be a quad having two levels of AND gates. Similarly, priority logic module 44 and priority logic module 46 may each be a quad having two levels of AND gates (as shown in module 42). The second level of AND gates in module 44 may have one input coming from module 42. Similarly, the second level of AND gates in module 46 may have one input coming from module 44. In this manner, priority logic 14 may function quickly and efficiently. Other embodiments of priority logic 14 and/or priority logic modules 40, 42, 44 and 46 will become apparent in light of FIG. 3.

Figure 4:
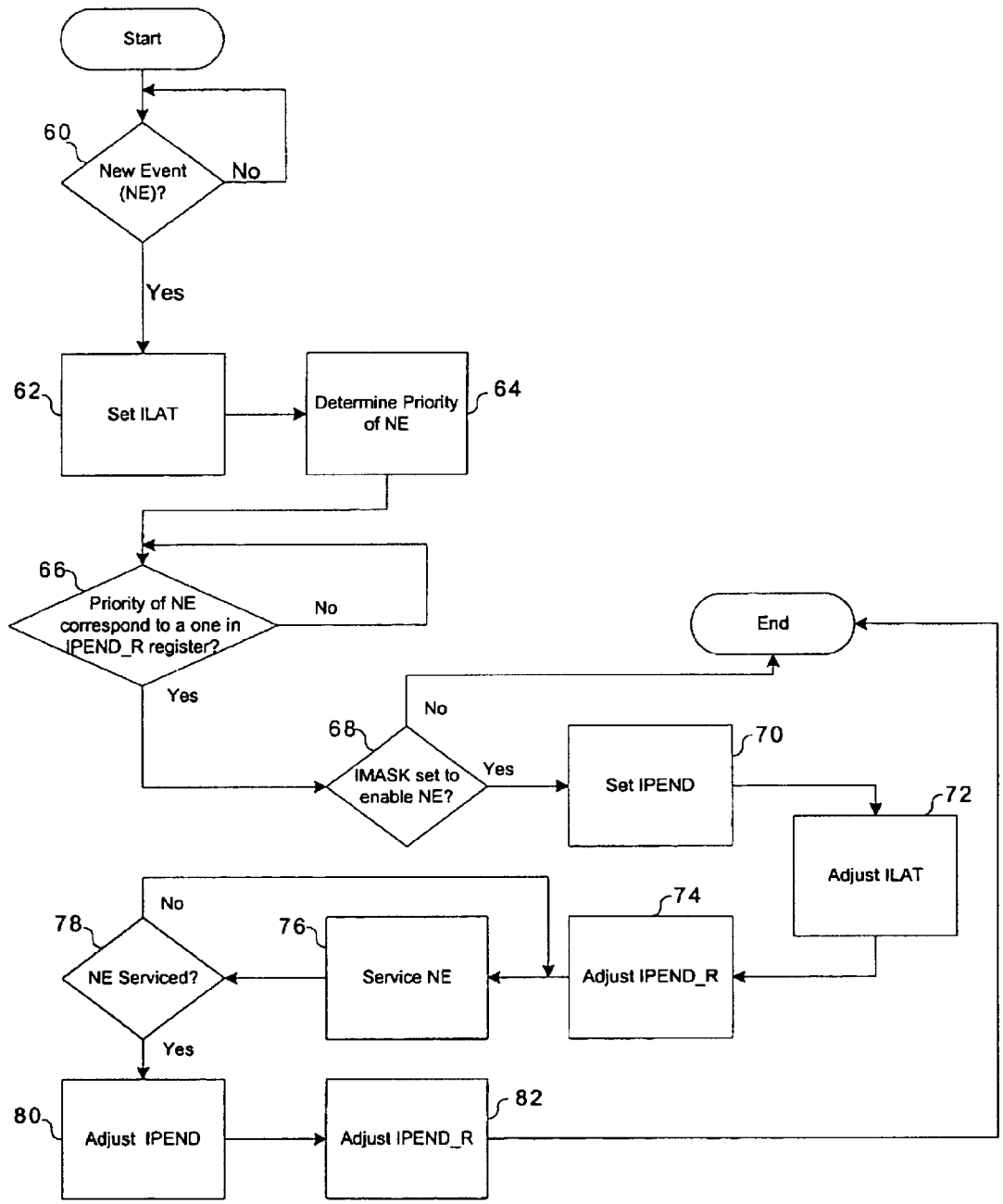
FIG. 4 is a flow diagram illustrating a mode of operation in accordance with an embodiment of the present invention.

FIG. 4 is a flow diagram illustrating a mode of operation in accordance with an embodiment of the present invention. When an event is received (60), its bit in ILAT may be set (62) and its priority may be determined (64). The event may not be serviced until its priority corresponds to a one in the IPEND_R register (66). If the event's priority corresponds to a one in IPEND_R (66) and IMASK (68), then its bit may be set in IPEND (70) and cleared in ILAT (72). Setting IPEND, in turn, may adjust the IPEND_R register (74). At this point the event is being serviced (76). Once the event has been serviced (78), its bit in IPEND may be set back to zero (80), which again may adjust IPEND_R (82).

Figure 5:
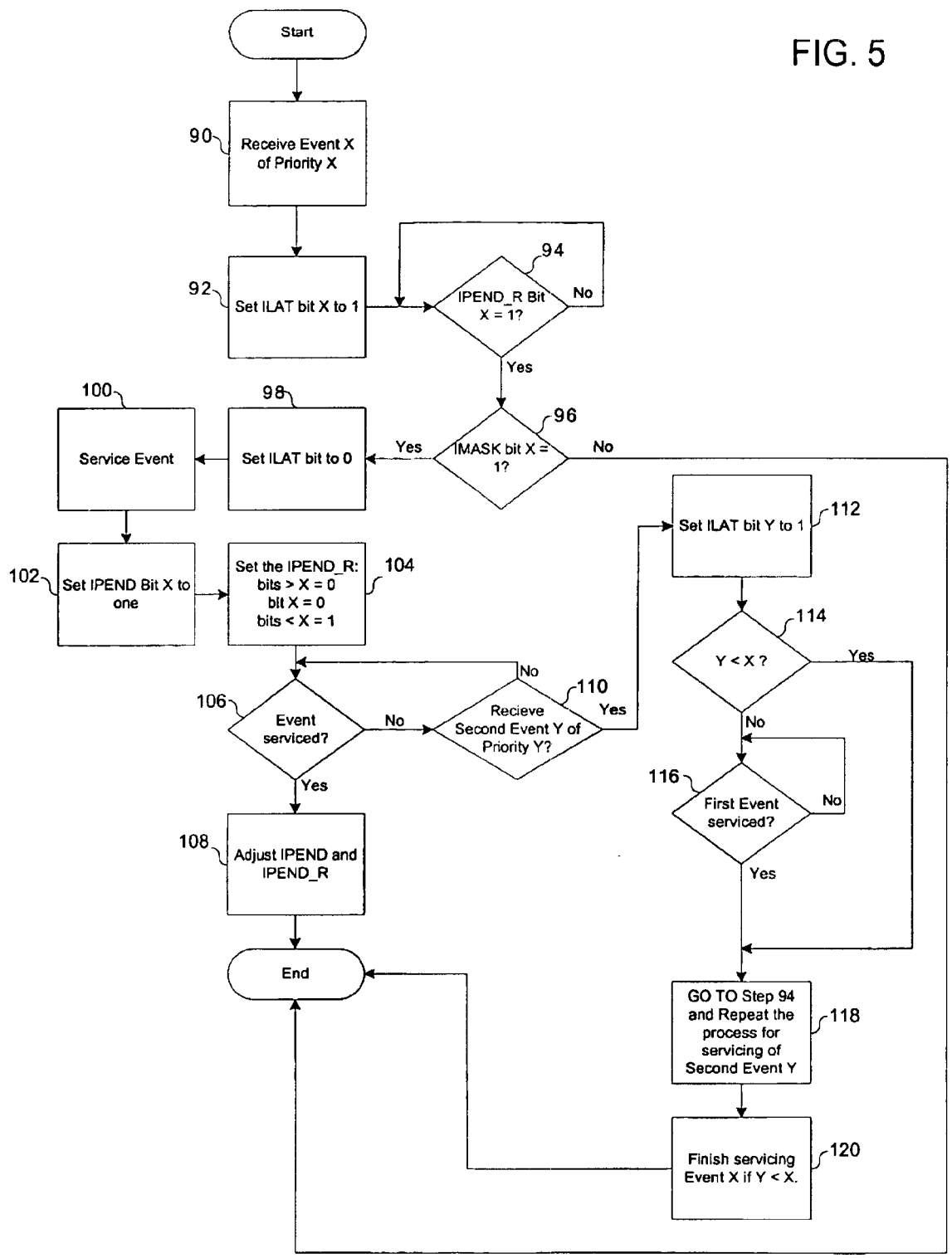
FIG. 5 is another flow diagram illustrating a mode of operation in accordance with an embodiment of the present invention.

FIG. 5 is another flow diagram illustrating a mode of operation in accordance with an embodiment of the present invention. FIG. 5 illustrates how one embodiment deals with nested events efficiently. When event X of priority X is received, the $X^{th}$ bit in ILAT may be set to one (92). Again, however, the event handler may not service the event unless and until its bits in IPEND_R (94) and IMASK (96) are set to one. If ILAT, IPEND_R and IMASK all have ones for the event's bit, then its ILAT bit may be set back to zero (98) and the event may be serviced (100). At this point, the event's bit in IPEND may be set to one (102). Setting IPEND (102), in turn, may adjust the IPEND_R (104). Once the event is serviced (106), the IPEND and IPEND_R may be adjusted again (108).

If a second event is received (110) before the event has been serviced (106), the second event's bit may be set to one in ILAT (112). If the second event does not have a higher priority than the first event (114), (quickly determined by examining IPEND_R), then the first event may be serviced (116). As shown at (118), the process beginning at step (94) may then be repeated for the second event.

If the second event does have a higher priority than the first event (114), (again, quickly determined by examining IPEND_R), then the second event may preempt the first event. As shown at (118), the process beginning at step (94) may be repeated for the second event. Then after the second event has been serviced, the circuit may finish servicing the first event (120).

Figure 6:
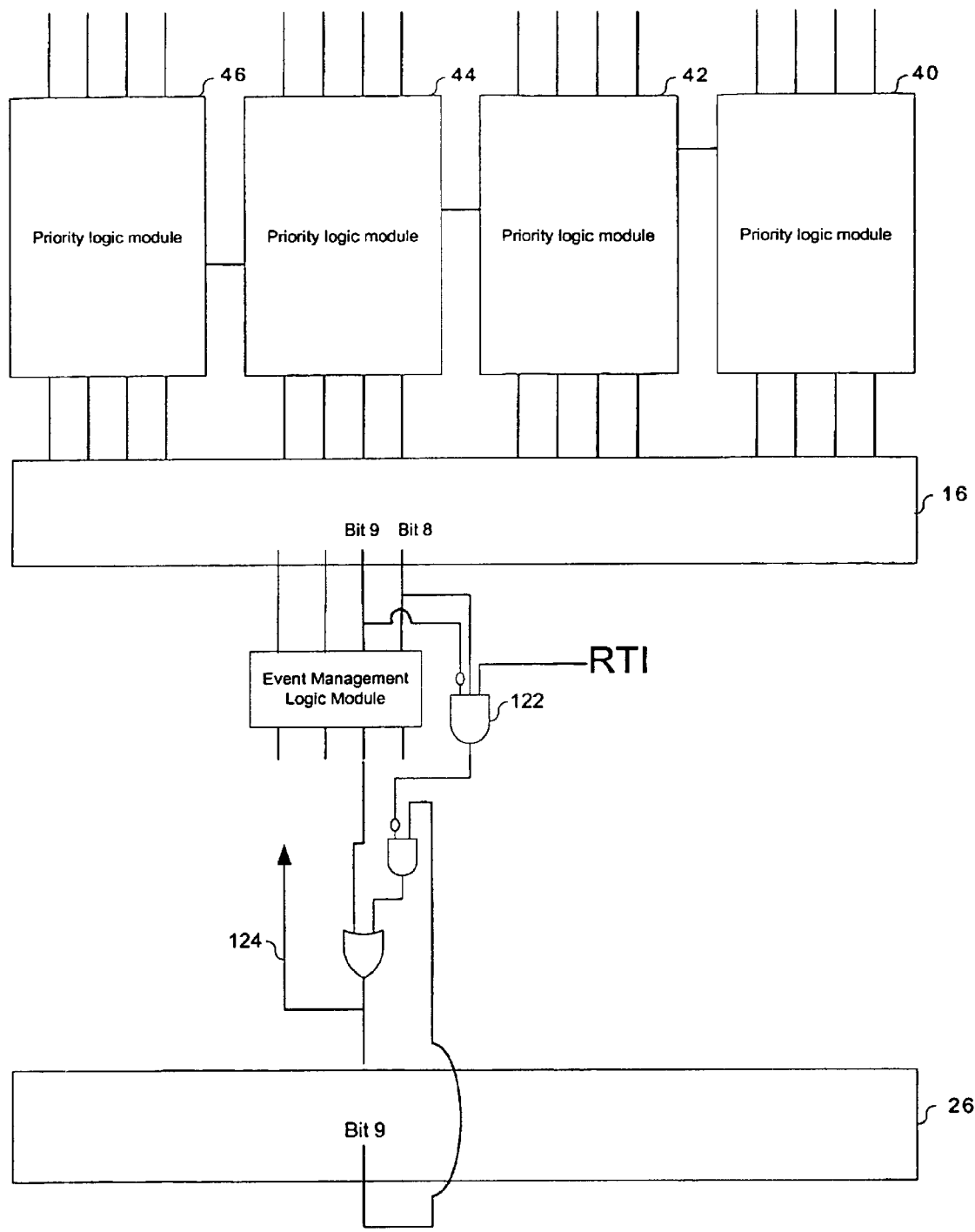
FIG. 6 is a circuit diagram illustrating a circuit for adjusting the status register in accordance with an embodiment of the present invention.

FIG. 6 is a circuit diagram illustrating an embodiment of a circuit that may be implemented to adjust the status register (IPEND) 26. FIG. 5 is exemplary circuitry for one bit in IPEND. Every other bit in IPEND may have similar circuitry associated with it.

A corresponding bit of IPEND 26 may be set to one for every event taken by the system. However, once a particular event's service routine has been executed, the corresponding bit in IPEND may need to be cleared to reflect this fact. As shown in FIG. 5, a transition in the IPEND_R register may be detected by a three way AND gate 122. As described above, a transition from zeros to ones in IPEND_R may define the currently active event bit in IPEND. The RTI input of gate 120 may detect the last instruction (e.g. the RTI instruction) of an event handler. Thus, when gate 122 detects both a transition in IPEND_R and an RTI instruction, the IPEND bit for that event may be cleared. Moreover the same signal 124 may be sent back to priority logic modules 40, 42, 44 and 46 to adjust IPEND_R 16 during the same clock cycle.

Figure 7:
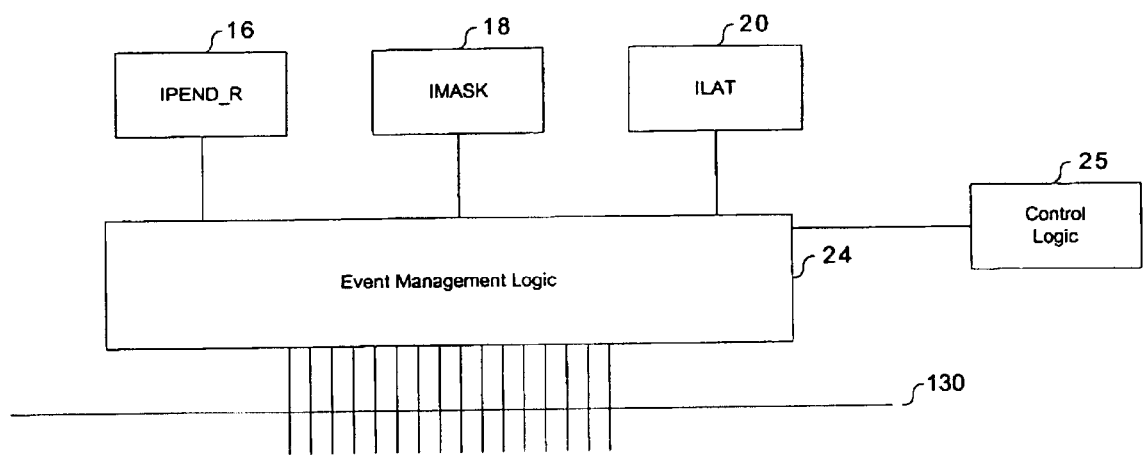
FIG. 7 is a circuit block diagram illustrating an event vector select line in accordance with an embodiment of the present invention.

FIG. 7 is a circuit block diagram illustrating another feature in accordance with an embodiment of the present invention. The IPEND_R, IMASK, and ILAT registers 16, 18 and 20 may all be connected to event management logic 24. Event management logic may be connected to control logic 25. Event management logic may be adapted so that its respective outputs are orthogonal with respect to one another. In other words, only one of the sixteen outputs from event management logic may be set at any given time. Thus, either no outputs from event management logic 24 may be set, or only one of the outputs may be set at a given time.

Based on these orthogonal signals, the event vector select line 130 may be used to determine which service routine needs to be fetched. Therefore, while the IPEND is being written (and priority logic generates a priority mask and writes it to IPEND_R), the event vector select line may be used to select the proper service routine. The service routine can then be fetched from ICACHE (not shown) and executed in an execution pipeline.

Figure 8:
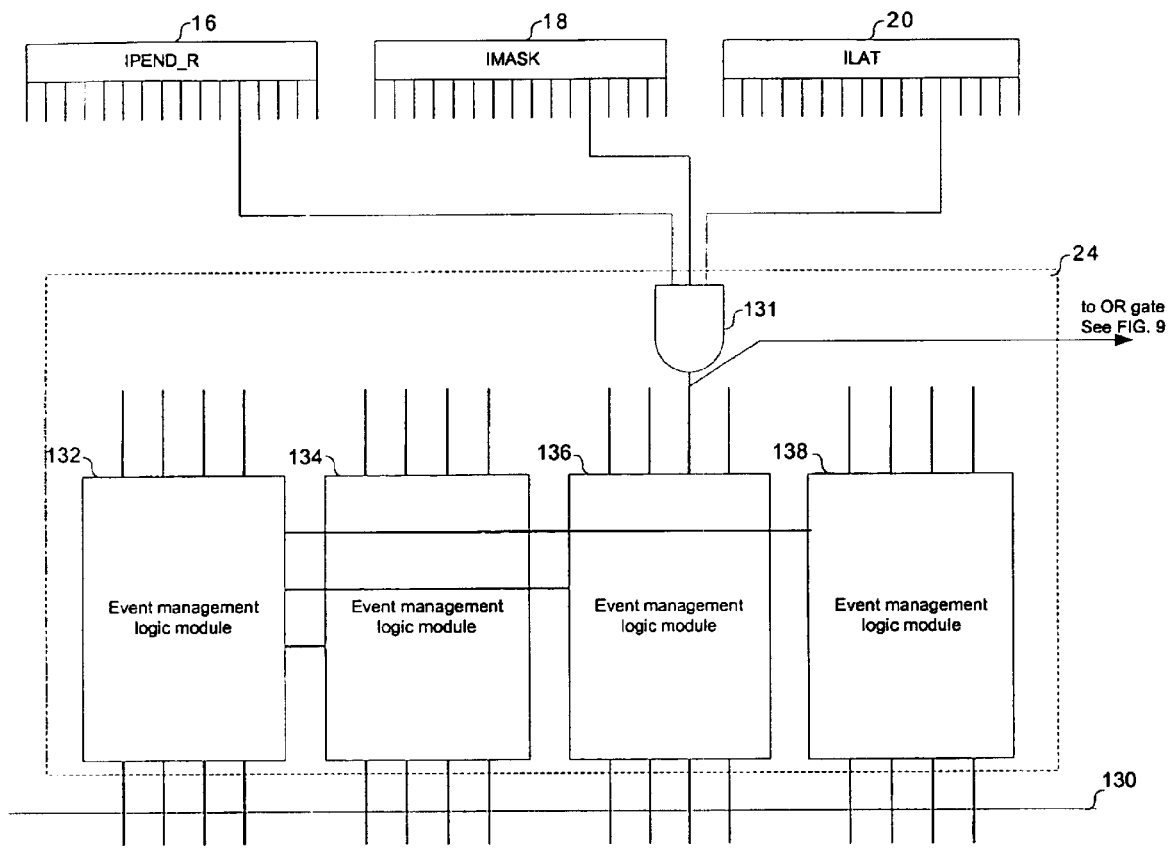
FIG. 8 is circuit block diagram illustrating registers connected to event management logic having modules in accordance with an embodiment of the present invention.

FIG. 8 is circuit block diagram illustrating an embodiment in accordance with the present invention showing registers 16, 18 and 20 connected to event management logic 24. As shown, the $4^{th}$ bit of each register may feed into AND gate 131. Every other bit of registers 16, 18 and 20 may feed into similar AND gates (not shown). In this manner, event management logic may only take events that have that ones written to all three registers 16, 18 and 20.

Event management logic 24 may implement event management logic modules 132, 134, 136 and 138 each having circuitry (see FIGS. 10-13 respectively) that insures that only one of the outputs of logic 24 can be hot at any given time. Thus, at the event vector select line 130, signals are orthogonal with respect to one another. Based on these orthogonal signals, the event vector select line 130 may be used to select an event from an event vector table (e.g., to specify which service routine needs to be fetched).

Figure 9:
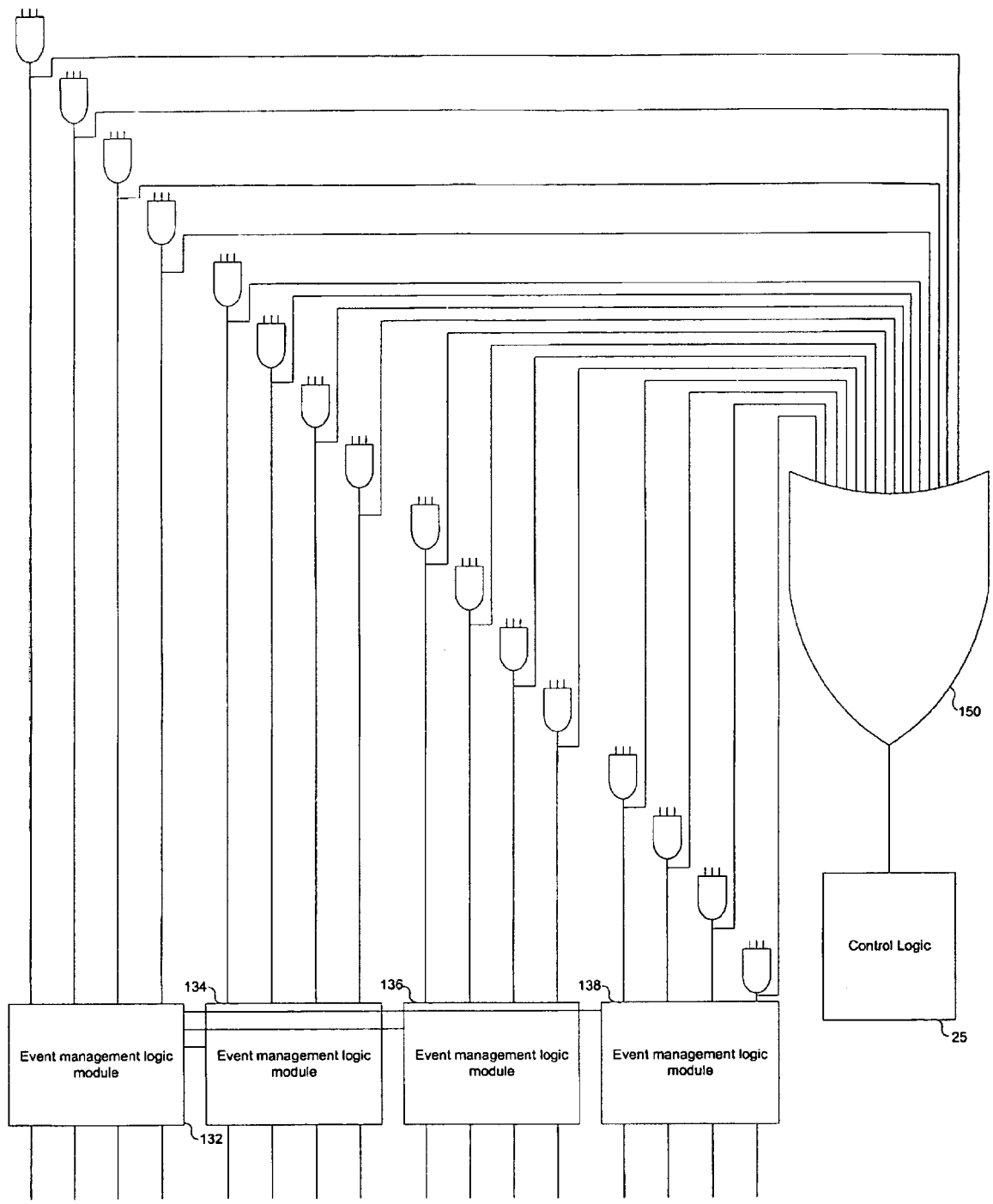
FIG. 9 is a circuit diagram illustrating how an early signal may be created in accordance with an embodiment of the present invention.

FIG. 9 is a circuit diagram illustrating another feature in accordance with an embodiment of the present invention. As stated above, the bits of registers 16, 18 and 20 may provide respective inputs to an AND gate similar to that shown in FIG. 8 at 131. FIG. 9 shows all sixteen AND gates, with respective outputs connected to event management logic modules 132, 134, 136 and 138. In addition, however, the outputs of the sixteen AND gates may also provide input to a sixteen-way OR gate 150. This OR gate 150, in turn, may be connected to control logic 25. In this manner, an early signal may be created indicating that an event is going to be taken in the next clock cycle. This early signal, then, may be used in control logic 25 to efficiently ml handle a change of flow.

Figure 10:
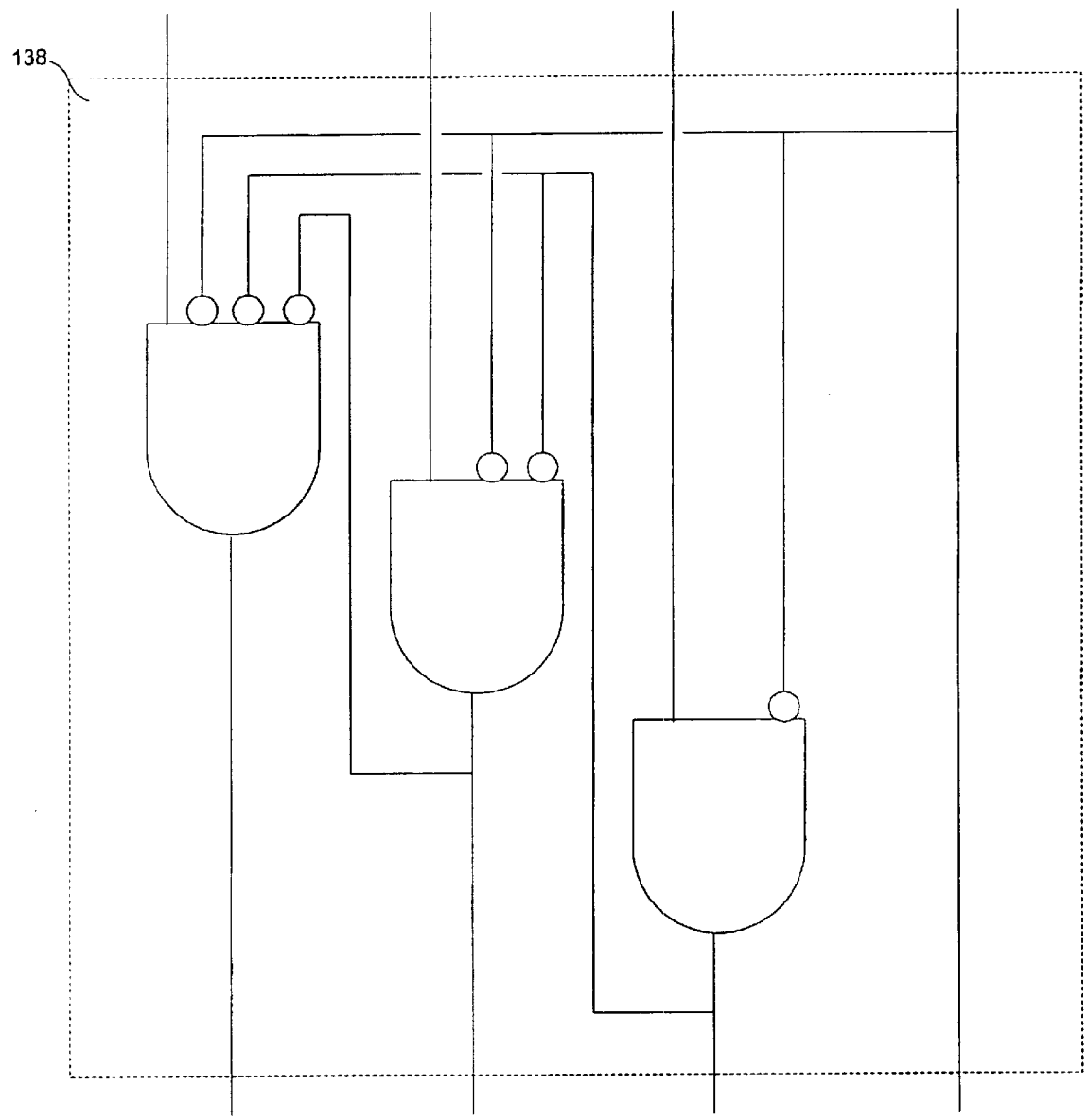
FIGS. 10-13 respectively show exemplary logic for the modules of FIG. 8 in accordance with an embodiment of the present invention.
Figure 11:
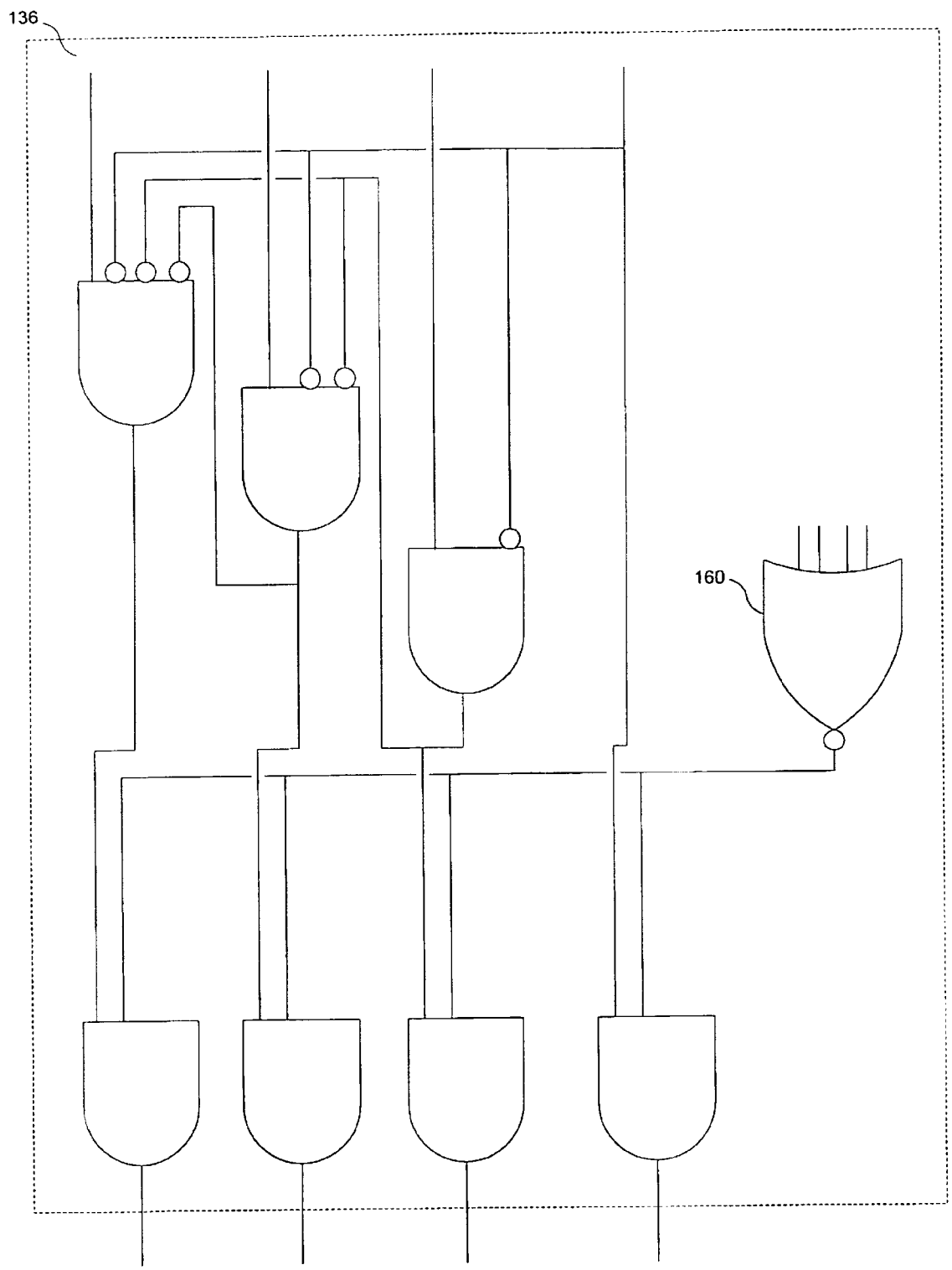
Figure 12:
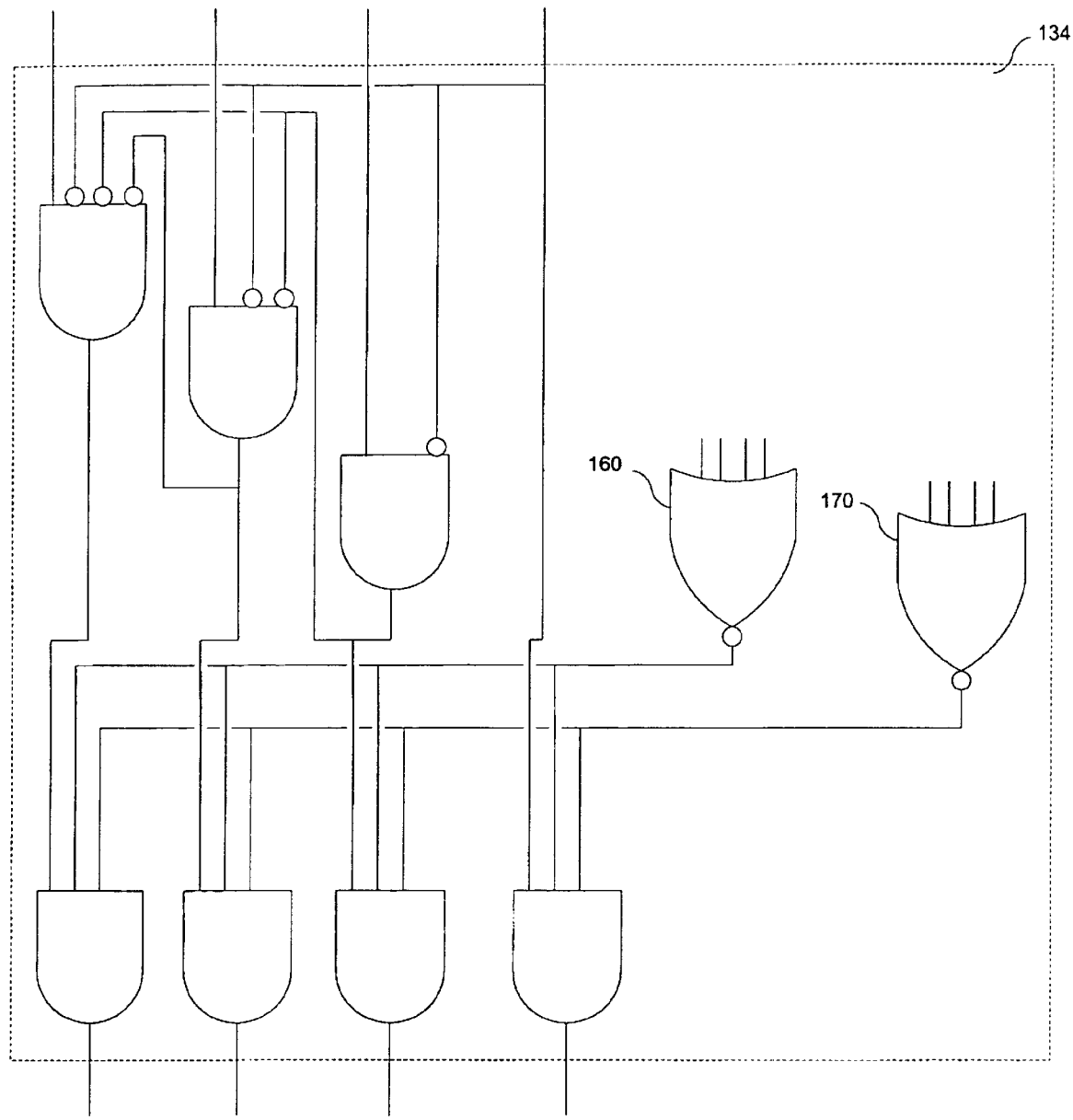
Figure 13:
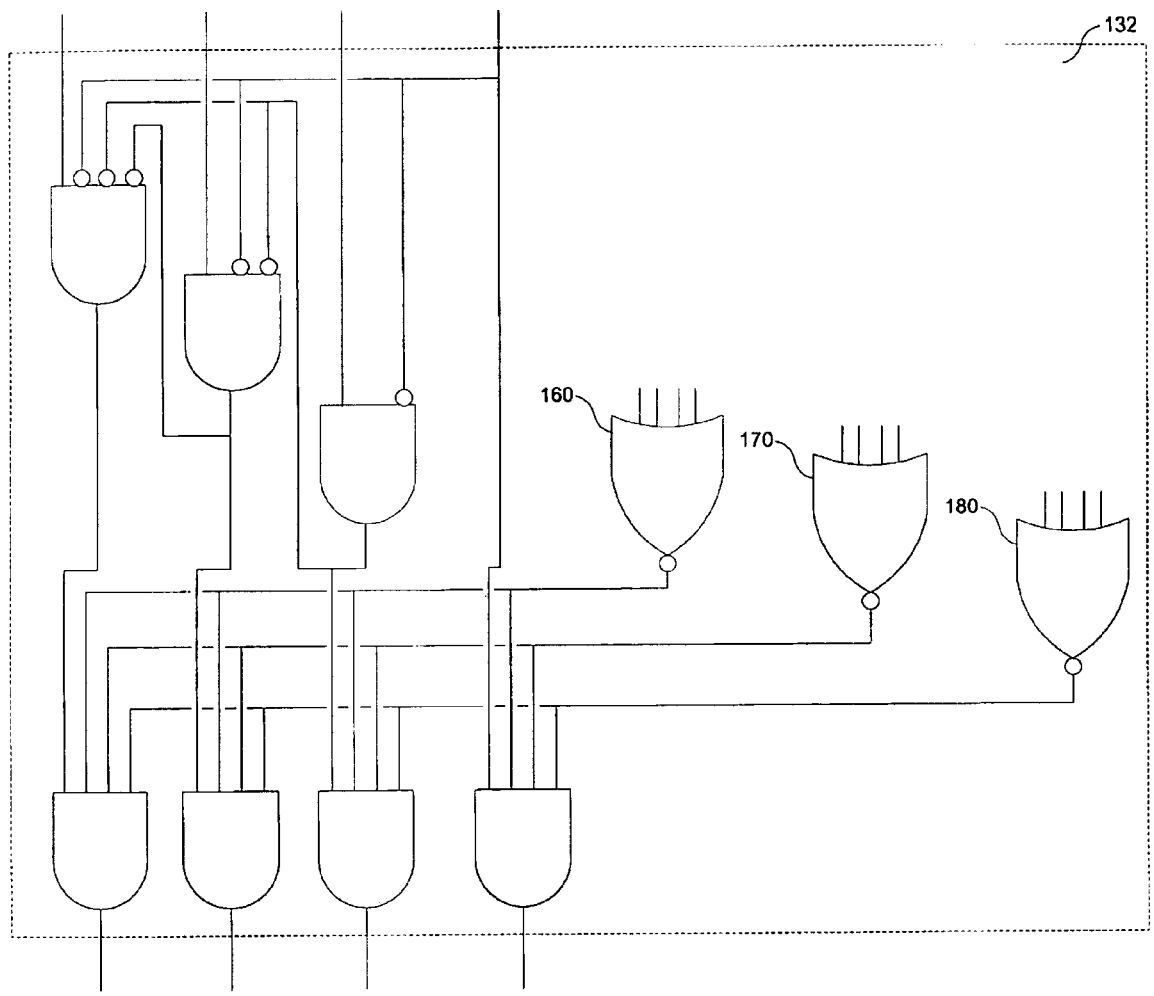

FIGS. 10-13 respectively show exemplary logic for event management logic modules 138, 136, 134, 132 that may be used to generate orthogonal signals at the event vector select line 130. FIG. 10 shows exemplary logic for module 138. FIG. 11 shows exemplary logic for module 136, including NOR gate 160. The inputs of NOR gate 160 may also be the inputs of module 138. FIG. 12 shows exemplary logic for module 134, including NOR gate 160 and NOR gate 170. The inputs of NOR gate 160 may be the same inputs of module 138, while the inputs of NOR gate 170 may be the inputs of module 136. FIG. 13 shows exemplary logic for module 132, including NOR gates 160, 170 and 180. Again, the inputs of gate 160 may be the inputs of module 138, the inputs of gate 170 may be the inputs of module 136, and the inputs of gate 180 may be the inputs of module 134. Other embodiments for generating an orthogonal signal at event vector select line 130 will become apparent in light of FIGS. 10-13.

Figure 14:
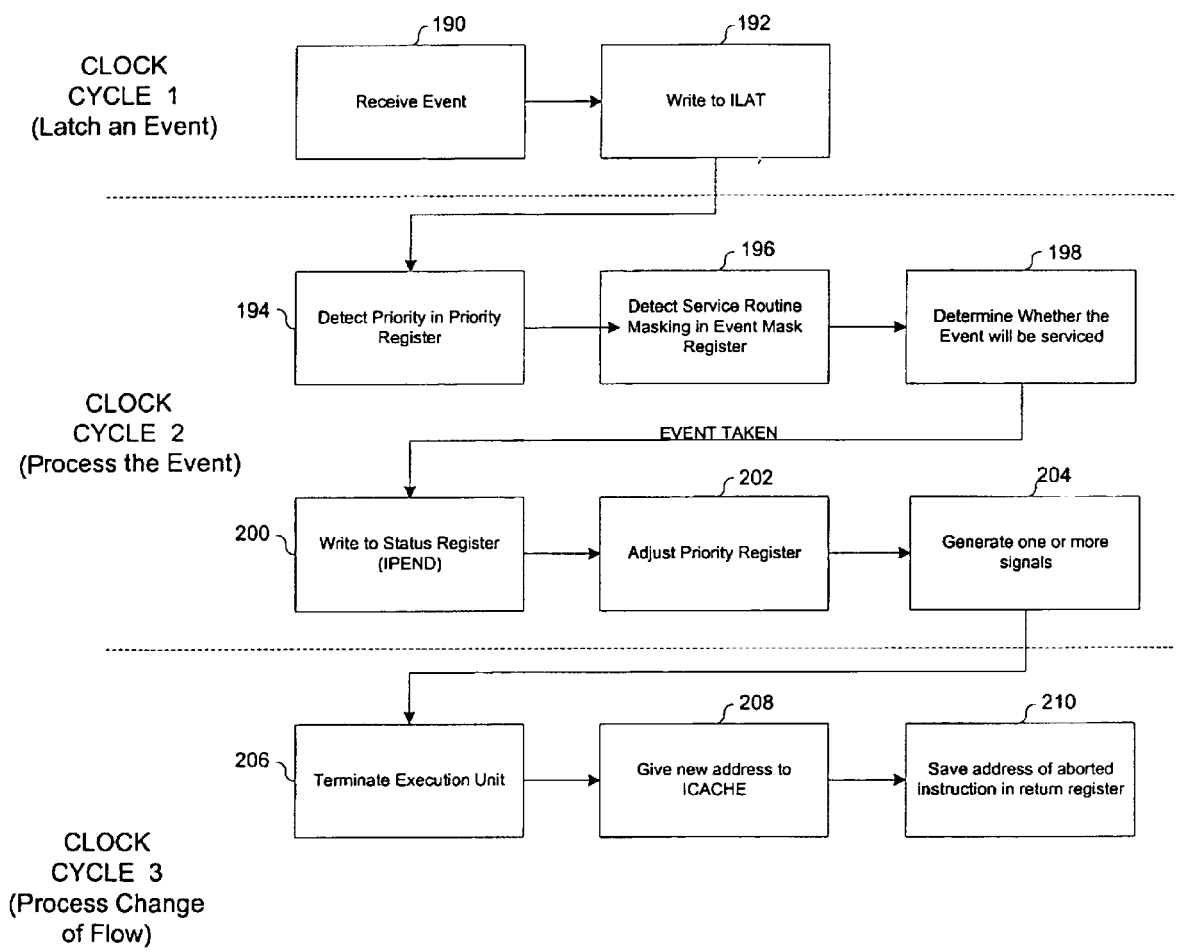
FIG. 14 is a flow diagram illustrating a mode of event service routine operation in accordance with an embodiment of the present invention.

FIG. 14 is a flow diagram illustrating a mode of event service routine operation. As shown, event management may take only three clock cycles. The first cycle may involve latching an event. During the first clock cycle an event may be received (190) and its bit may be set in ILAT (192).

During the second clock cycle an event may be processed. During the second clock cycle, priority detection (194) and event masking (196) may determine whether an event will be taken (198). If so, the event's bit may be written to a status register (200) and the priority register may be adjusted (202). In addition, one or more signals may be generated to facilitate processing the change of flow (204). These signals may include an early signal indicating that a new event is going to be taken, or orthogonal signals that may be used to select a proper service routine.

During the third clock cycle a change of flow may be processed. The execution unit may be terminated (206) and a new event address may be given to the ICACHE (208). In addition, the addresses of aborted one or more aborted instructions may be saved in a return register (210). The proper service routine may then be executed in the execution unit during subsequent clock cycles.

Various embodiments of the invention have been described. For example, a processor having an event handler that generates a priority mask indicating a set of serviceable events and a set of non-serviceable events has been described. The processor may be implemented in a variety of systems including general purpose computing systems, digital processing systems, laptop computers, personal digital assistants (PDA's) and cellular phones. In any such system, the processor may be coupled to a memory device, such as a FLASH memory device or a static random access memory (SRAM) that stores an operating system and other software applications. These and other embodiments are within the scope of the following claims.

What is claimed is:

1. A method comprising:
   receiving a first event in a priority logic unit adapted to handle a set of prioritized events, the priority logic unit including a plurality of logic modules including a first priority logic module and at least one or more lower priority logic modules having a lower priority than the first priority logic module; and
   generating a priority mask using the priority logic unit, the priority mask indicating a set of serviceable events and a set of non-serviceable events,
   wherein said generating the priority mask comprises generating a subset of the mask within the first priority logic module and propagating a priority status bit to the one or more lower priority modules, the priority status bit operative to cause each of the one or more lower priority logic modules to generate a corresponding subset of the priority mask indicating a set of non-serviceable events.

2. The method of claim 1, wherein generating a subset of the priority mask comprises generating an event active bit for the first event, generating ones for higher priority events and generating zeros for lower priority events.

3. The method of claim 1, the method further comprising updating a priority register in accordance with the priority mask.

4. The method of claim 3, the method further comprising:
   receiving a second event; and
   servicing the second event if the second event is a serviceable event as determined by the priority mask.

5. The method of claim 4, the method further comprising:
   generating a new priority mask based on an assigned priority of the second event, wherein the new priority mask indicates a set of serviceable events and a set of non-serviceable events; and
   updating a priority register in accordance with the new priority mask.

6. The method of claim 3, the method further comprising:
   receiving a second event;
   setting an event latched register to reflect that the second event was received;
   detecting an event mask register to determine whether the first event may be serviced; and
   servicing the event when:
     the second event is a serviceable event as determined by the priority mask,
     the event latched register is set to reflect that the second event was received, and
     the event mask register does not mask the second event.

7. The method of claim 3, the method further comprising:
   setting an event status register to reflect that the first event is being serviced.

8. The method of claim 7, wherein setting the event status register and updating the priority register occur during a same clock cycle.

9. The method of claim 1, the method further comprising:
   generating a signal indicating that a new event is going to be taken.

10. The method of claim 9, wherein generating a signal indicating that a new event is going to be taken and generating a priority mask, occur during a same clock cycle.

11. An apparatus comprising:
    a control unit including:
    a priority logic unit to generate a priority mask indicating a set of serviceable events and a set of non-serviceable events when an event is received in the priority logic unit, the priority logic unit including
      a first priority logic module to generate a first subset of the priority mask, and
      one or more lower priority logic modules, each of the one or more lower priority logic modules operative to generate a corresponding subset of the priority mask,
    wherein the first priority logic module is operative to propagate a priority status bit to the one or more lower priority logic modules when the event is received in the first priority logic module, the priority status bit operative to cause the one or more lower priority logic modules to generate subsets of the priority mask indicating non-serviceable events.

12. The apparatus as in claim 11, wherein the control unit includes a priority register, the control unit being adapted to update the priority register in accordance with the priority mask.

13. The apparatus as in claim 11, wherein the set of serviceable events have assigned priorities higher than the first event.

14. The apparatus as in claim 12, the apparatus adapted to:
    receive a second event in the control unit; and
    execute the second event in an execution unit if the second event is a serviceable event as determined by the priority mask.

15. The apparatus as in claim 14, the control unit adapted to:
    generate a second priority mask based on an assigned priority of the second event if the second event is a serviceable event as determined by the priority mask, wherein the second priority mask indicates a set of serviceable events and a set of non-serviceable events; and
    update the priority register in accordance with the second priority mask.

16. The apparatus as in claim 12, the control unit further comprising an event latched register and an event mask register, the control unit further adapted to:

receive a second event;

set the event latched register to reflect that the second event was received;

detect the event mask register to determine whether the first event may be serviced; and service the event when:

the second event is a serviceable event as determined by the priority mask, the event latched register is set to reflect that the second event was received, and the event mask register does not mask the second event.

17. The apparatus as in claim 11, the control unit further comprising an event status register, the control unit being adapted to set the event status register to reflect that the first event is being serviced.

18. The apparatus as in claim 17, wherein the control unit is adapted to set the event status register and update the priority register during a same clock cycle.

19. The apparatus as in claim 11, wherein the control unit is adapted to generate a signal indicating that a new event is going to be taken.

20. The apparatus as in claim 11, wherein each of the set of priority logic modules is adapted to handle four events.

21. A system comprising:

a static random access memory device; and a processor coupled to the memory device, wherein the processor includes a control unit including:

priority logic unit to generate a priority mask indicating a set of serviceable events and a set of non-serviceable events when an event is received in the priority logic unit, the priority logic unit including a first priority logic module to generate a first subset of the priority mask, and one or more lower priority logic modules, each of the one or more lower priority logic modules operative to generate a corresponding subset of the priority mask, wherein the first priority logic module is operative to propagate a priority status bit to the one or more lower priority logic modules when the event is received in the first priority logic module, the priority status bit operative to cause the one or more lower priority logic modules to generate subsets of the priority mask indicating non-serviceable events.

22. The system as in claim 21, wherein the control unit includes a priority register, the control unit being adapted to update the priority register in accordance with the priority mask.

23. The system as in claim 21, the processor further including an execution unit connected to the control unit.

24. The system as in claim 23, the processor adapted to:

receive a second event in the control unit; and execute the second event in the execution unit if the second event is a serviceable event as determined by the priority mask.

25. The system as in claim 21, the control unit including event management logic adapted to generate orthogonal signals.

26. The system as in claim 25, the control unit including control logic adapted to use the orthogonal signals to select an address of a next instruction.

27. A method comprising:

generating a priority mask indicating a set of serviceable events and a set of non-serviceable events by generating a first subset of the priority mask within a first priority logic module one or more subsets of the priority mask in one or more lower priority logic modules having a lower priority that the first priority logic module; and propagating a priority status bit to the one or more lower priority logic modules, the priority status bit operative to cause the one or more lower priority logic modules to generate subsets of the priority mask indicating non-serviceable events.

* * * * *

UNITED STATES PATENT AND TRADEMARK OFFICE
CERTIFICATE OF CORRECTION

| | | |
|---|---|---|
| PATENT NO. | : 6,842,812 B1 | Page 1 of 1 |
| APPLICATION NO. | : 09/705207 | |
| DATED | : January 11, 2005 | |
| INVENTOR(S) | : Ravi P. Singh, Charles P. Roth and Gregory A. Overkamp | |

It is certified that error appears in the above-identified patent and that said Letters Patent is hereby corrected as shown below:

Title page, (73) Assignee, following "Intel Corporation, Santa Clara, CA (US)", please add --Analog Devices, Inc., Norwood, MA (US)--.

Signed and Sealed this

Fourth Day of September, 2007

JON W. DUDAS
*Director of the United States Patent and Trademark Office*